(12) United States Patent
McCain

(10) Patent No.: US 8,750,340 B1
(45) Date of Patent: Jun. 10, 2014

(54) LASER ORDNANCE SAFE-ARM DISTRIBUTOR

(75) Inventor: J. Wayne McCain, Athens, AL (US)

(73) Assignee: Intuitive Research and Technology Corporation, Huntsville, AL (US)

( * ) Notice: Subject to any disclaimer, the term of this patent is extended or adjusted under 35 U.S.C. 154(b) by 560 days.

(21) Appl. No.: 13/191,084

(22) Filed: Jul. 26, 2011

Related U.S. Application Data

(60) Provisional application No. 61/368,373, filed on Jul. 28, 2010.

(51) Int. Cl.
*H01S 3/13* (2006.01)

(52) U.S. Cl.
USPC .......................... 372/29.01; 372/26

(58) Field of Classification Search
USPC ............................... 372/29.01, 26
See application file for complete search history.

(56) References Cited

U.S. PATENT DOCUMENTS

| | | | |
|---|---|---|---|
| 5,206,455 A * | 4/1993 | Williams et al. | 102/201 |
| 6,173,650 B1 * | 1/2001 | Garvick et al. | 102/202.5 |
| 2005/0183605 A1 * | 8/2005 | Bishop et al. | 102/201 |

* cited by examiner

*Primary Examiner* — Kinam Park
(74) *Attorney, Agent, or Firm* — Venable LLP; Robert S. Babayi

(57) ABSTRACT

An improved ignition safety device (ISD) employs one or more optical switches to accomplish a SAFE-ARM function for a laser initiated ordnance system (LIOS). At least one optical switch along with appropriate control and status monitoring provide an optical SAFE-ARM function and optionally a distribution function. An optical switch performing the SAFE-ARM function diverts a laser signal to a heat sink assembly when in a SAFED position and switches to the LIOS when in an ARMED position. When in the SAFED position, the LOSAD provides an optical block in the laser energy path between a laser firing unit and the LIOS to prevent inadvertent ordnance operation. An optical switch performing the distribution function has two or more switch positions that direct a received laser signal to two or more laser initiated devices.

24 Claims, 4 Drawing Sheets

LASER ORDNANCE SAFE-ARM DISTRIBUTOR

FIELD OF THE INVENTION

The present invention relates generally to a laser ordnance SAFE-ARM distributor. More particularly, the present invention relates to the use of optical switches and control and status monitoring to accomplish optical SAFE-ARM and distributor functions for laser ordnance initiators.

BACKGROUND OF THE INVENTION

Laser ordnance initiators use a laser to initiate an explosive via an optical fiber. Such initiators are reliable and generally make unintentional initiation difficult. Safety features for such laser ordnance initiators are governed by the United States Department of Defense military standard MIL-STD-1901A titled "Design Criteria Standard for Munition Rocket and Missile Motor Ignition System Design". The standard requires all such designs to include an ignition safety device (ISD), or SAFE-ARM device, whose purpose is to prevent an unintended function of the rocket or missile motor through interruption of the pyrotechnic train, interruption of the firing energy train, or control of the energy required to arm the ISD and operate the initiator. More specifically, the standard requires low-power ignition systems to employ a SAFE-ARM device that provides a physical interruption in the laser energy path between a laser firing unit (or source) and the intended target ordnance (or receptor) to prevent inadvertent ordnance operation.

Paragraph 5.2.3.1 of MIL-STD-1901A provides compliance criteria for firing energy train interruption with low voltage devices and provides an example of a firing energy train, which would require interruption, is an ignition system using a low voltage (activated by less than 500 volts) laser diode, with associated optical transmission hardware and an approved in line pyrotechnic. At least one firing energy train interrupter is required if low voltage devices are used. Low voltage devices are defined as those incorporating initiators requiring less than 500 volts or less than the maximum voltage available in the ignition system prior to commit to launch (whichever is greater). Interruption of the low voltage alone in these applications is not an acceptable design. The design of the firing energy train interruption shall comply with the following:
a. The interrupter shall be rendered ineffective by the arming energy and automatically return to a non-armed state upon removal of the arming energy.
b. If the first pyrotechnic element is positioned such that safety is dependent upon the presence of an interrupter, the design shall include positive means to prevent the ISD from being assembled without the properly positioned interrupter.
c. If the first pyrotechnic element is positioned such that omission of the interrupter will prohibit transfer to the pyrotechnic train, a single interrupter is acceptable.
d. The effectiveness of the interruption prior to initiation of the arming sequence shall be determined numerically and the methodology and results presented and justified to the appropriate service safety authority.

The conventional approach for providing SAFE-ARM functionality to laser initiated ordnance systems (LIOS) has been to relegate the function to electronic circuitry and to not provide a physical interruption or 'block' in the laser optical ignition train. As such, there is a need for an improved SAFE-ARM and distribution device for a LIOS that complies with MIL-STD-1901A.

SUMMARY OF THE INVENTION

Briefly, the present invention is an improved SAFE-ARM and distribution device for a laser initiated ordnance system. The invention employs an optical switch to provide a laser signal a laser energy path between a laser firing unit and a laser initiated ordnance device or to divert the laser signal to a heat sink assembly thereby by providing a SAFE-ARM function. The invention may also employ an optical switch to distribute a laser signal to one of two laser initiated ordnance devices.

In accordance with one embodiment of the invention, a laser initiated ordnance system comprises a laser firing unit for providing a laser signal, a heat sink assembly, a first optical switch for receiving said laser signal and for providing an optical SAFE-ARM function, and a control system. The first optical switch has an ARMED switch position and a SAFED switch position. The ARMED switch position provides the laser signal a laser energy path between the laser firing unit and a first laser initiated ordnance device. The SAFED switch position diverts the laser signal to said heat sink assembly, where diverting said laser signal to said heat sink assembly provides a physical interruption in the laser energy path between the laser firing unit and the first laser initiated device. The control system can receive status information from the first optical switch. The laser initiated ordnance system may comprise a fiber optic line.

The laser initiated ordnance system may further comprise a second optical switch for receiving the laser signal from the first optical switch and for providing a distribution function. The second optical switch has a first switch position for distributing the laser signal to the first laser initiated ordnance device and a second switch position for distributing the laser signal to the second laser initiated ordnance device where the control system also controls the second optical switch. The control system can also receive status information from the second optical switch.

In accordance with the invention, an optical switch enables signals in optical fibers to be selectively switched from one circuit to another. The optical can be one of a photonic switch, a slow optical switch, or a fast optical switch. The optical switch may physically switch lights via electronic switching between fiber transponders. The optical switch may operate by physically shifting an optical fiber to drive one or more alternative fibers. The optical switch may operate by changing the optical properties of a material in response to an electric field, where the optical properties may involve one of a change of the absorption properties of the material or a change of the refractive index of the material. The optical switch may transmit light through a layer of magneto-optic material resulting in the Faraday effect whereby the plane of polarization can be rotated. The optical switch may employ at least one of electro-optic effects, magneto-optic effects, piezoelectric beam steering, inkjet methods, liquid crystals that rotate polarized light, thermal methods that vary the index of refraction in one leg of a interferometer, acousto-optic methods, an amplifiers, or attenuators.

In accordance with the invention, an optical switch is a micro-electrical-mechanical-systems (MEMS) optical switch. The MEMS optical switch can be one of a piezoelectric switch, an electrostatic switch, or electromagnetic switch. The MEMS optical switch may utilize micro-mirrors to switch or reflect an optical channel or signal from one location to another depending on the relative angle of the micro-mirror. The optical switch can be an electrostatic mirror-based active MEMS optical switching device involving dual-axes tilting MEMS mirror technology.

In accordance with another embodiment of the invention, a laser initiated ordnance method comprises the steps of providing a laser signal from a laser firing unit, receiving the laser signal at a first optical switch providing a SAFE-ARM function, and controlling the first optical switch, where the first optical switch has an ARMED switch position for providing the laser signal a laser energy path between said laser firing unit and a first laser initiated ordnance device and the first optical switch has a SAFED switch position for diverting the laser signal to a heat sink assembly.

The laser initiated ordnance method may further comprise the steps of receiving the laser signal at a second optical switch providing a distribution function and controlling the second optical switch, where the second optical switch has a first switch position for distributing the laser signal to the first laser initiated ordnance device and a second switch position for distributing the laser signal to a second laser initiated ordnance device.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

The present invention will now be described more fully in detail with reference to the accompanying drawings, in which the preferred embodiments of the invention are shown. This invention should not, however, be construed as limited to the embodiments set forth herein; rather, they are provided so that this disclosure will be thorough and complete and will fully convey the scope of the invention to those skilled in the art. Like numbers refer to like elements throughout.

The present invention provides an improved ignition safety device (ISD) for a laser initiated ordnance system (LIOS). Generally, the improved ISD employs optical switches such as those used in the telecommunications industry to accomplish the optical SAFE-ARM function required by MIL-STD-1901A. Specifically, the improved ISD is a laser ordnance SAFE-ARM distributor (LOSAD) comprising at least one optical switch along with appropriate control and status monitoring to accomplish an optical SAFE-ARM function for the LIOS and optionally a distribution function. An optical switch performing the SAFE-ARM function diverts the laser signal to a heat sink assembly when in a SAFED position and switches to the laser initiated ordnance device when in an ARMED position. When in the SAFED position, the LOSAD provides an optical block in the laser energy path between a laser firing unit (source) and the intended target ordnance (receptor) to prevent inadvertent ordnance operation. An optical switch performing the distribution function has two or more switch positions that direct a received laser signal to two or more laser initiated devices.

The LOSAD device acts as an interrupter switch when used in the SAFE-ARM function and as a laser energy distribution device when used in the 'distributor' function. Block diagrams of these two modes of operation are provided in FIGS. 1 and 3, respectively.

Figure 1:
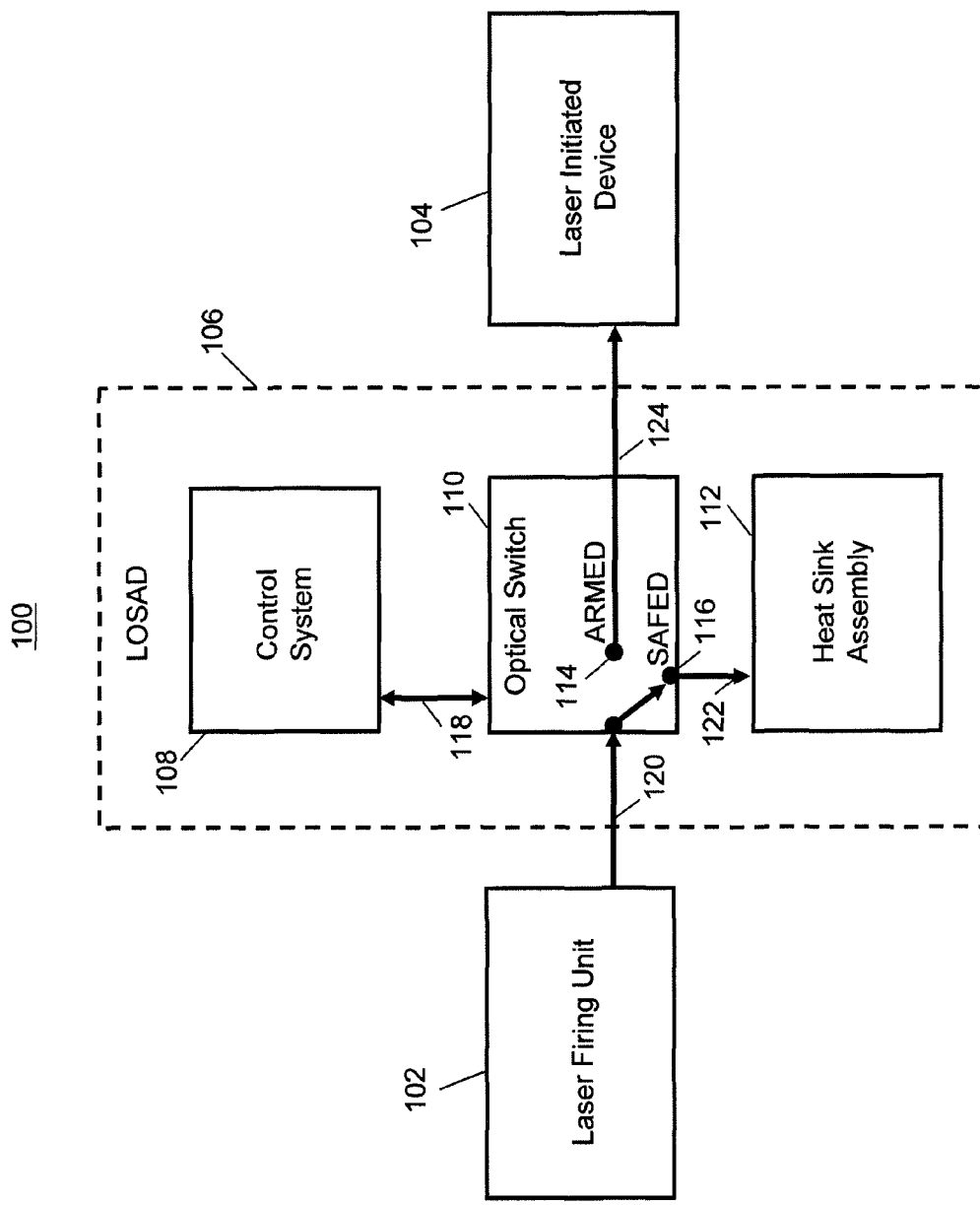
FIG. 1 depicts an exemplary laser ordnance SAFE-ARM distributor being used to provide a SAFE-ARM function.

FIG. 1 depicts an exemplary laser ordnance SAFE-ARM distributor being used to provide a SAFE-ARM function for a laser initiated ordnance system having one laser initiated device. Referring to FIG. 1, LIOS 100 includes a laser firing unit 102, a laser initiated device 104, and a LOSAD 106. The LOSAD 106 includes a control system 108, an optical switch 110, and a heat sink assembly 112. The optical switch 110 has an ARMED position 114 and a SAFED position 116. The optical switch 110 receives control commands from and provides status information to the control system 108 via a control and status interface 118. The optical switch 110 receives a laser signal via an input line 120, which may be a fiber optic input line. When in the SAFED position 116, as shown in FIG. 1, the laser signal is diverted to the heat sink assembly 112 via a first output line 122 thereby providing a physical interruption (or optical block) in the laser energy path between the laser firing unit 102 and the laser initiated device 104. When in the ARMED position 114, the laser signal is provided to the laser initiated device 104 via a second output line 124. The laser initiated device 104 would typically be a laser initiated ordnance device.

In accordance with the invention, an optical switch 110 can be any switch that enables signals in optical fibers to be selectively switched from one circuit to another. The optical switch 110 may physically switch light via electronic switching between fiber transponders such as, for example, photonic switches that exploit nonlinear material to steer light. An optical switch may operate by mechanical means (i.e., physically shifting an optical fiber to drive one or more alternative fibers). Such optical switches are considered slow optical switches. Alternatively, an optical switch may operate by electro-optic effects, which involves changing the optical properties of a material in response to an electric field. Such changing of optical properties may involve a change of the absorption properties of the material or a change of the refractive index of the material. An optical switch may also operate by magneto-optic effects, which involves transmitting light through a layer of magneto-optic material resulting in what is called the Faraday effect whereby the plane of polarization can be rotated. Optical switches employing electro-optic effects or magneto-optic effects are considered fast optical switches. Various other types of optical switches involve various other technical approaches including piezoelectric beam steering, inkjet methods, liquid crystals that rotate polarized light, thermal methods that vary the index of refraction in one leg of a interferometer, acousto-optic methods, and amplifiers and attenuators. Generally, all sorts of optical switches can be employed in accordance with the invention, although fast optical switches are preferable for a LIOS.

In accordance with the invention the optical switch 110 can be a micro-electrical-mechanical-systems (MEMS) optical switch, which utilizes micro-mirrors to switch or reflect an optical channel or signal from one location to another depending on the relative angle of the micro-mirror. MEMS optical switches may be piezoelectric, electrostatic or electromagnetic. Piezoelectric switches utilize piezoelectric materials to change shape proportionally to how much electrical voltage is applied to them. As such, a mirror that is attached to the piezoelectric material can be manipulated by applying varying degrees of electrical voltage. Electrostatic switches utilize the small electrostatic force produced by a diamagnetic material when an electrical field is induced upon it. Electromagnetic optical switches utilize ferromagnetic materials to rotate and manipulate the angle of the mirror.

In a preferred embodiment of the invention, the optical switch 110 is an electrostatic mirror-based active MEMS optical switching device involving dual-axes tilting MEMS mirror technology. Such electrostatic mirror-based active MEMS optical switching devices are commercially available from DiCon Fiberoptics, Inc.

Figure 2:
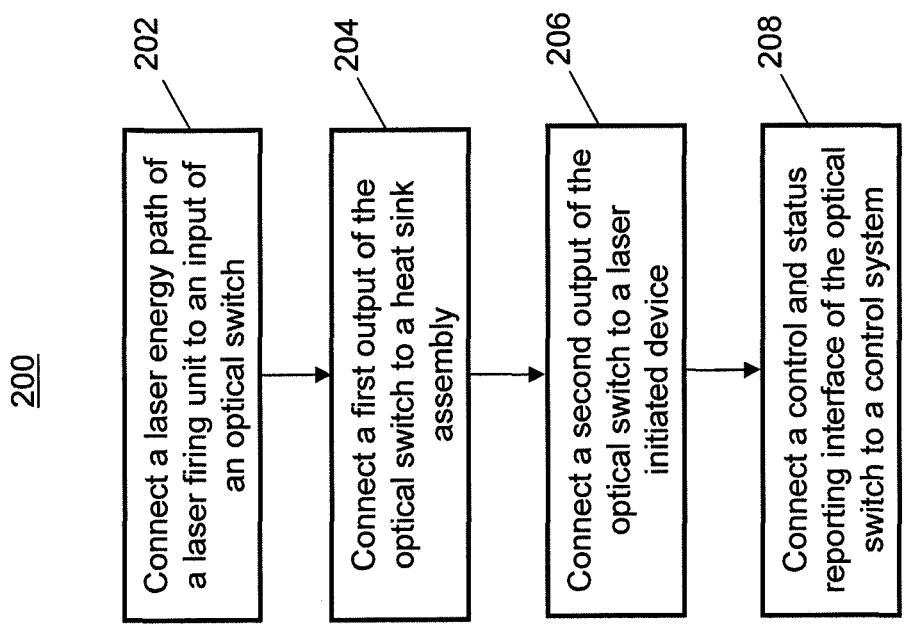
FIG. 2 depicts an exemplary method for providing a SAFE-ARM function.

FIG. 2 depicts an exemplary method 200 for providing a SAFE-ARM function to a LIOS. Referring to FIG. 2, the method 200 comprises four steps including a first step 202 of connecting a laser energy path of a laser firing unit to an input of an optical switch, a second step 204 of connecting a first output of the optical switch to a heat sink assembly, a third step 206 of connecting a second output of the optical switch to a laser initiated device, and a fourth step 208 of connecting a control and status interface of the optical switch to a control system. The first output of the optical switch corresponds to a SAFED position and the second output of the optical switch corresponds to an ARMED position. The status mode of the optical switch (SAFE or ARMED) is reported electronically to the control system based on the actual position of the optical switch, for example, the mirror of a mirror-based active MEMS optical switch.

Figure 3:
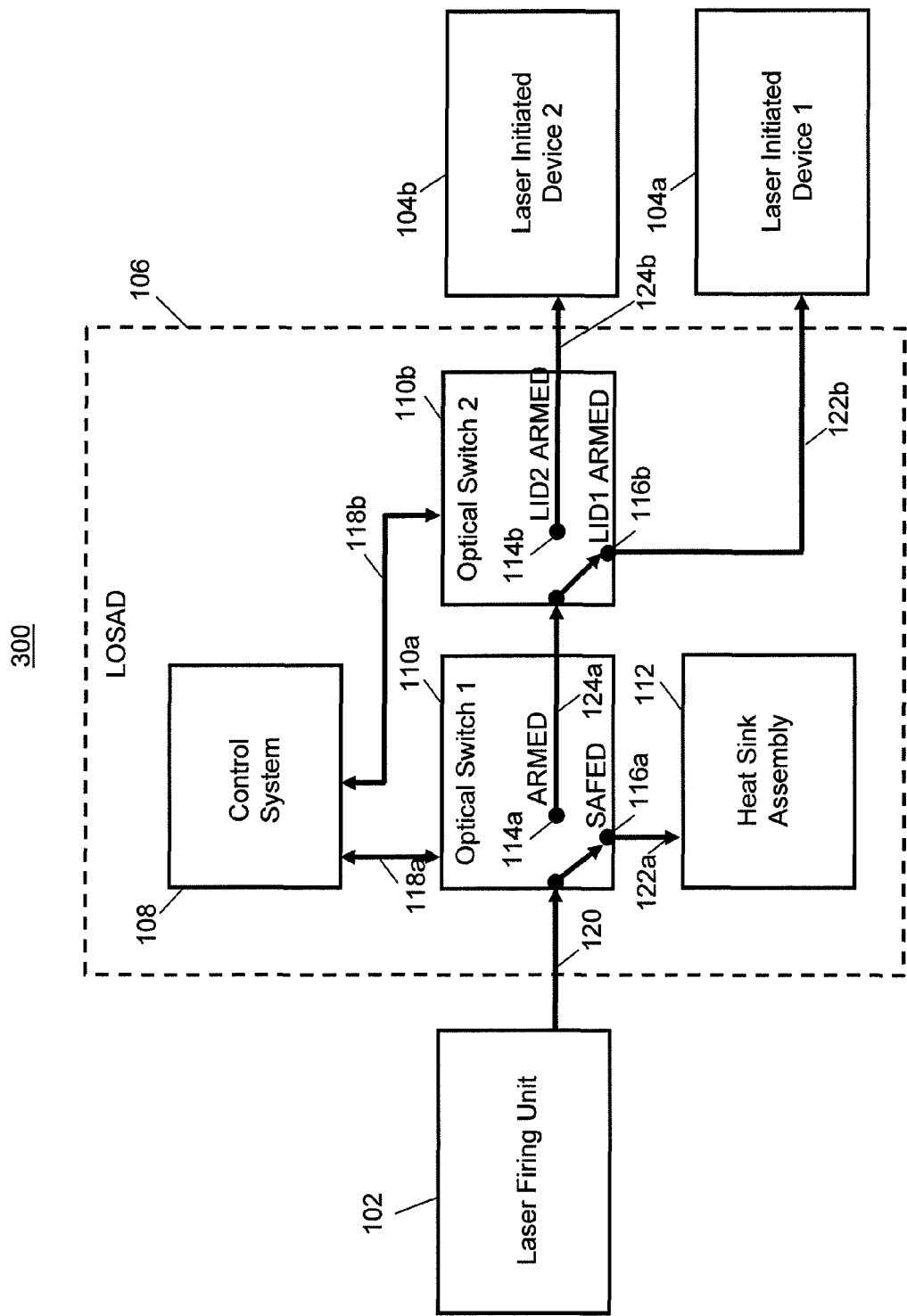
FIG. 3 depicts an exemplary laser ordnance SAFE-ARM distributor being used to provide both SAFE-ARM and distributor functions.

FIG. 3 depicts an exemplary laser ordnance SAFE-ARM distributor being used to provide both SAFE-ARM and distributor functions for a laser initiated ordnance system having multiple laser initiated devices. Referring to FIG. 3, LIOS 300 includes a laser firing unit 102, a first laser initiated device 104a, a second laser initiated device 104b, and a LOSAD 106. The LOSAD 106 includes a control system 108, a first optical switch 110a, a second optical switch 110b, and a heat sink assembly 112. The first optical switch 110a has an ARMED position 114a and a SAFED position 116a. The first optical switch 110a receives control commands from and provides status information to the control system 108 via a first control and status interface 118a. The first optical switch 110a receives a laser signal via an input line 120, which may be a fiber optic input line. When in the SAFED position 116a, as shown in FIG. 3, the laser signal is diverted to the heat sink assembly 112 via a first output line 122a thereby providing a physical interruption (or optical block) in the laser energy path between the laser firing unit 102 and the first and second laser initiated devices 104a 104b. When in the ARMED position 114, the laser signal is provided to the second optical switch 110b via a second output line 124a. The first and second laser initiated devices 104a 104b would typically be laser initiated ordnance devices. One skilled in the art will recognize that an optical switch used as a distributor may have more than two outputs and therefore directly control more than two laser initiated devices and will also understand that multiple optical switches can be cascaded to control more than two laser initiated devices.

The second optical switch 110b has a LID2 ARMED position 114b and a LID1 ARMED position 116b. The second optical switch 110b receives control commands from and provides status information to the control system 108 via a second control and status interface 118b, where the control system 108 selects which one of the first and second laser devices 104a 104b is to receive the laser signal when the first optical switch 110a is ARMED and outputs a laser signal to the second optical switch 110b. The second optical switch 110b receives a laser signal via the second output line 124a of the first optical switch, which may be a fiber optic input line. When in the LID1 ARMED position 116b, as shown in FIG. 3, the laser signal is provided to the first laser initiated device 104a via a third output line 122b. When in the LID2 ARMED position 114b, the laser signal is provided to the second laser initiated device 104b via a fourth output line 124b. As such, the second optical switch 110b provides a distributor function to distribute the laser signal to the first and second laser initiated devices 104a 104b.

Figure 4:
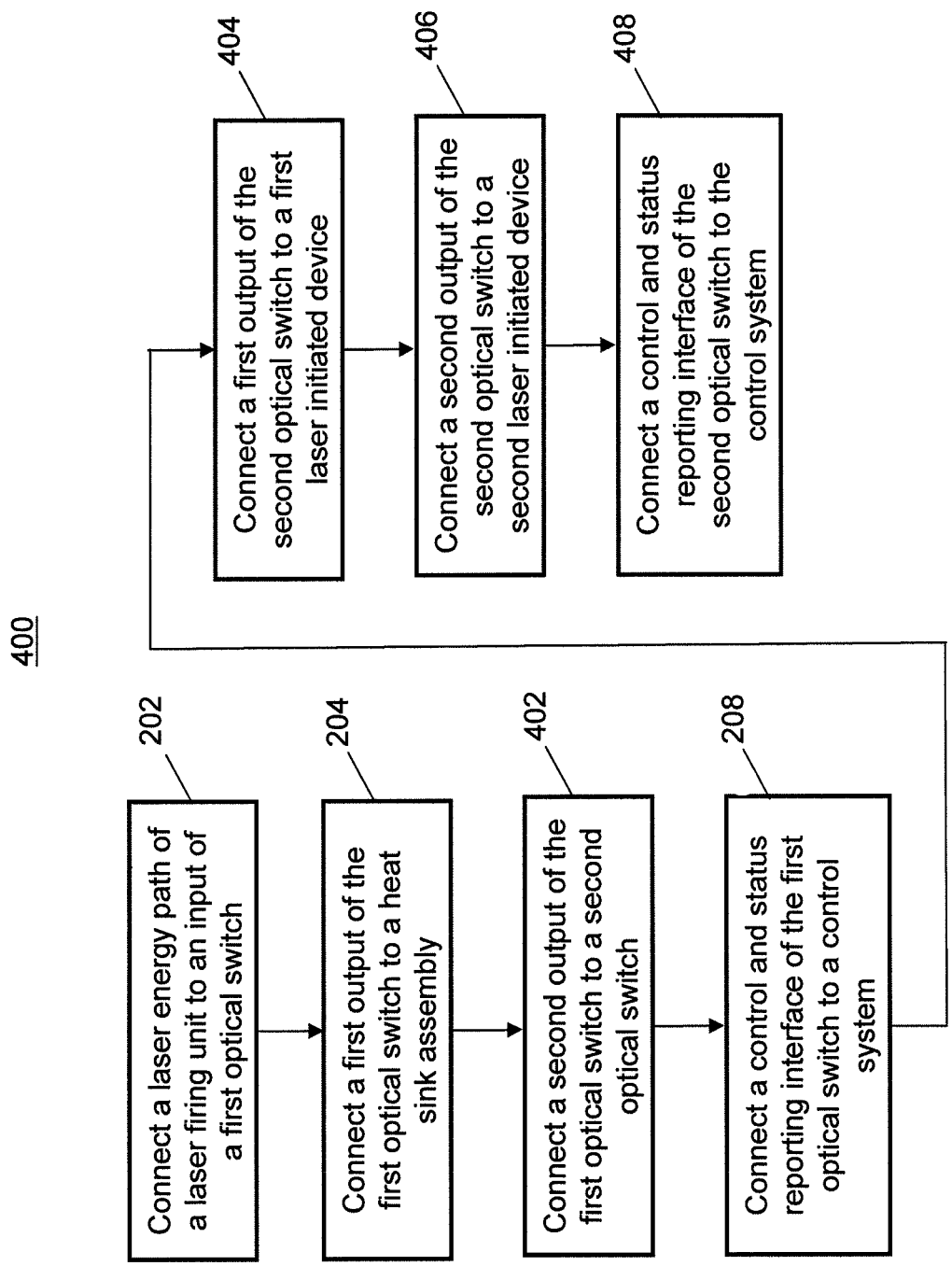
FIG. 4 depicts an exemplary method for providing both a SAFE-ARM function and a distributor function.

FIG. 4 depicts an exemplary method for providing both a SAFE-ARM function and a distributor function to a LIOS. Referring to FIG. 4, the method 400 comprises seven steps including the first step 202 of connecting a laser energy path of a laser firing unit to an input of a first optical switch, the second step 204 of connecting a first output of the first optical switch to a heat sink assembly, a third step 402 of connecting a second output of the first optical switch to a second optical switch, a fourth step 208 of connecting a control and status interface of the first optical switch to a control system, a fifth step 404 of connecting a first output of the second optical switch to a first laser initiated device, a sixth step 406 of connecting a second output of the second optical switch to a second laser initiated device, and a seventh step 408 of connecting a control and status reporting interface of the second optical switch to the control system. The first output of the first optical switch corresponds to a SAFED position and the second output of the first optical switch corresponds to an ARMED position. The first output of the second optical switch corresponds to a LID2 ARMED position and the second output of the first optical switch corresponds to an LID1 ARMED position. The status mode of the first optical switch (SAFE or ARMED) is reported electronically to the control system based on the actual position of the first optical switch, for example, the mirror of a mirror-based active MEMS optical switch. The status mode of the second optical switch (LID1 ARMED or LID2 ARMED) is reported electronically to the control system based on the actual position of the second optical switch, for example, the mirror of a mirror-based active MEMS optical switch.

Advantages of the LOSAD optical switch device include the following:

Provides independent and autonomous optical SAFE-ARM function for LIOS-equipped applications, thus meeting the requirement for insertion of a mechanical optical block [interrupt] in the typical laser ordnance firing train [MIL-STD-1901A compliance], Improves overall safety by addition of separate (from the LFU) enabling, arming, and firing commands, Eliminates electromechanical status indicators, a source of performance issues in some existing Department of Defense systems, and Reduces overall LIOS system costs by eliminating multiple laser diodes and associated electronic circuitry when LOSAD is used in the 'distributor' mode.

MEMS technology reduces weight and size of present such units.

The DiCon MEMS device allows TTL and/or $I^2C$ data buss interfacing for control and status indication.

According to the above, a device comprises a laser signal generator outputting a laser signal. A switch having an input coupled to the laser signal generator with a first position coupled to a first output, and a second position coupled to a second output. A heat sink is coupled to the first output of the switch. The switch is in the first position when the device is in a safe mode and the switch is in the second position when the device is in a armed mode. The heat sink receives the laser signal when the switch is in the safe mode; and the device provides the laser signal to the second output of the switch when the switch is in the armed mode. A control unit coupled to the first switch, with the control unit monitoring the position of the first switch and controls the position of the switch. The switch can be optical switch or a micro-electrical-mechanical-systems optical switch.

While particular embodiments of the invention have been described, it will be understood, however, that the invention is not limited thereto, since modifications may be made by those skilled in the art, particularly in light of the foregoing teachings.

The invention claimed is:

1. A laser initiated ordnance system, said laser initiated ordnance system comprising:
   a laser firing unit for providing a laser signal;
   a heat sink assembly;
   a first optical switch for receiving said laser signal and for providing an optical SAFE-ARM function, said first optical switch having an ARMED switch position and a SAFED switch position, said ARMED switch position for providing said laser signal a laser energy path between said laser firing unit and a first laser initiated ordnance device, said SAFED switch position for diverting said laser signal to said heat sink assembly; and
   a control system for controlling said first optical switch.

2. The laser initiated ordnance system of claim 1, wherein said control system receives status information from said first optical switch.

3. The laser initiated ordnance system of claim 1, further comprising:
   a fiber optic line.

4. The laser initiated ordnance system of claim 1, wherein diverting said laser signal to said heat sink assembly provides a physical interruption in the laser energy path between the laser firing unit and the first laser initiated device.

5. The laser initiated ordnance system of claim 1, further comprising:
   a second optical switch for receiving said laser signal from said first optical switch and for providing a distribution function, said second optical switch having a first switch position for distributing said laser signal to said first laser initiated ordnance device, said second optical switch having a second switch position for distributing said laser signal to said second laser initiated ordnance device, said control system controlling said second optical switch.

6. The laser initiated ordnance system of claim 5, wherein said control system receives status information from said second optical switch.

7. The laser initiated ordnance system of claim 1, wherein said first optical switch enables signals in optical fibers to be selectively switched from one circuit to another.

8. The laser initiated ordnance system of claim 1, wherein said first optical switch is one of a photonic switch, a slow optical switch, or a fast optical switch.

9. The laser initiated ordnance system of claim 1, wherein said first optical switch physically switch lights via electronic switching between fiber transponders.

10. The laser initiated ordnance system of claim 1, wherein said first optical switch operates by physically shifting an optical fiber to drive one or more alternative fibers.

11. The laser initiated ordnance system of claim 1, wherein said first optical switch operates by changing the optical properties of a material in response to an electric field.

12. The laser initiated ordnance system of claim 11, wherein said optical properties involve one of a change of the absorption properties of the material or a change of the refractive index of the material.

13. The laser initiated ordnance system of claim 1, wherein said first optical switch transmits light through a layer of magneto-optic material resulting in the Faraday effect whereby the plane of polarization can be rotated.

14. The laser initiated ordnance system of claim 1, wherein said first optical switch employs at least one of electro-optic effects, magneto-optic effects, piezoelectric beam steering, inkjet methods, liquid crystals that rotate polarized light, thermal methods that vary the index of refraction in one leg of a interferometer, acousto-optic methods, an amplifiers, or attenuators.

15. The laser initiated ordnance system of claim 1, wherein said first optical switch is a micro-electrical-mechanical-systems (MEMS) optical switch.

16. The laser initiated ordnance system of claim 15, wherein said MEMS optical switch is one of a piezoelectric switch, an electrostatic switch, or electromagnetic switch.

17. The laser initiated ordnance system of claim 15, wherein said MEMS optical switch utilizes micro-mirrors to switch or reflect an optical channel or signal from one location to another depending on the relative angle of the micromirror.

18. The laser initiated ordnance system of claim 1, wherein said first optical switch is an electrostatic mirror-based active MEMS optical switching device involving dual-axes tilting MEMS mirror technology.

19. A device comprising:
   a laser signal generator, the laser signal generator outputting a laser signal;
   a switch, the switch having an input coupled to the laser signal generator, a first position coupled to a first output, and a second position coupled to a second output; and
   a heat sink coupled to the first output of the switch, wherein the switch is in the first position when the device is in a safe mode and the switch is in the second position when the device is in a armed mode, wherein the heat sink receives the laser signal when the switch is in the safe mode; and
   wherein the device provides the laser signal to the second output of the switch when the switch is in the armed mode.

20. The device of claim 19, further comprising:
   a control unit coupled to the first switch, wherein the control unit monitors the position of the first switch and controls the position of the switch.

21. The device of claim 19, wherein the switch is optical switch.

22. The device of claim 19, wherein the switch is a micro-electrical-mechanical-systems optical switch.

23. A device comprising:
   a laser signal generator, the laser signal generator outputting a laser signal;
   a first switch, the first switch having an input coupled to the laser signal generator, a first position coupled to a first output and a second position coupled to a second output; and
   a heat sink coupled to the first output of the first switch;
   a second switch, the second switch having an input coupled to the second output of the first switch, a first position coupled to a first output and a second position coupled to a second output; and wherein the first switch is in the first position when the device is in a safe mode and the first switch is in the second position when the device is in a armed mode, wherein the heat sink receives the laser signal when the first switch is in the safe mode; and wherein the second switch receives the laser signal when the first switch is in the armed mode; and wherein the device provides the laser signal to the first or second output of the second switch when the first switch is in the armed mode.

24. The device of claim 23, further comprising:

a first control unit coupled to the first switch, wherein the first control unit monitors the position of the first switch and controls the position of the first switch, and a second control unit coupled to the second switch, wherein the second control unit monitors the position of the second switch and controls the position of the second switch.

* * * * *